(No Model.) 10 Sheets—Sheet 2.
B. F. WRIGHT.
COMPRESSED AIR ENGINE.
No. 408,784. Patented Aug. 13, 1889.
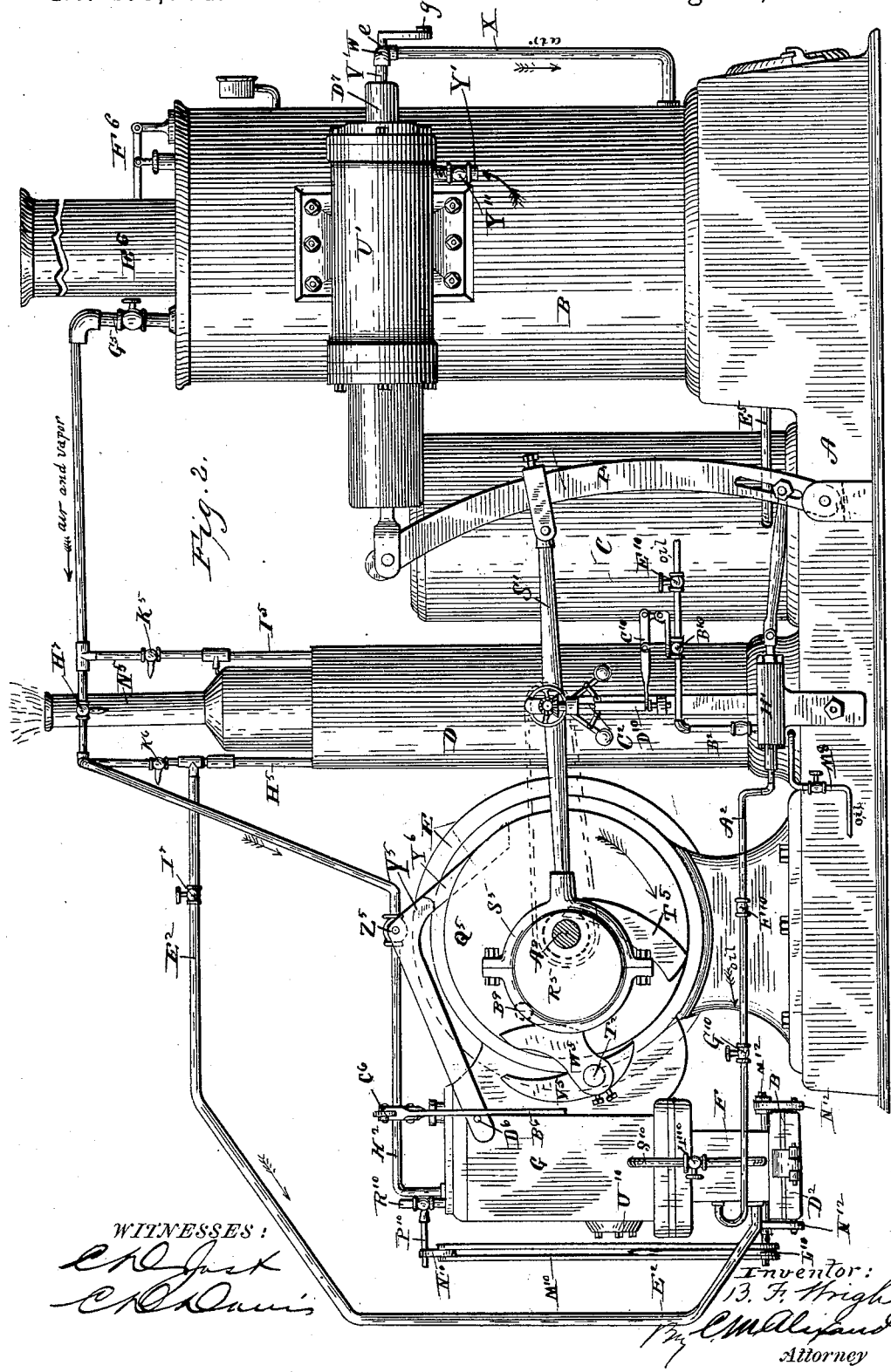

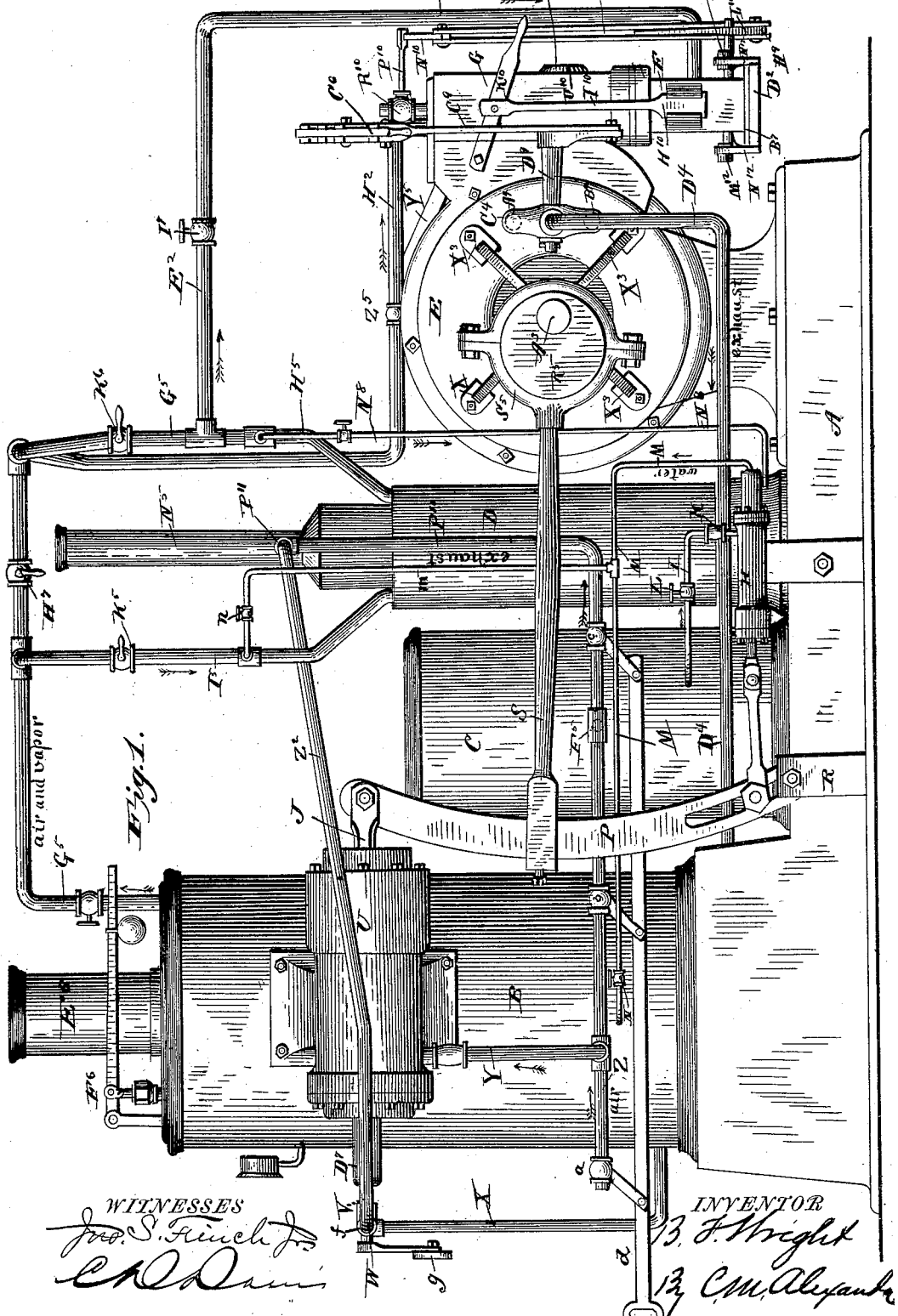

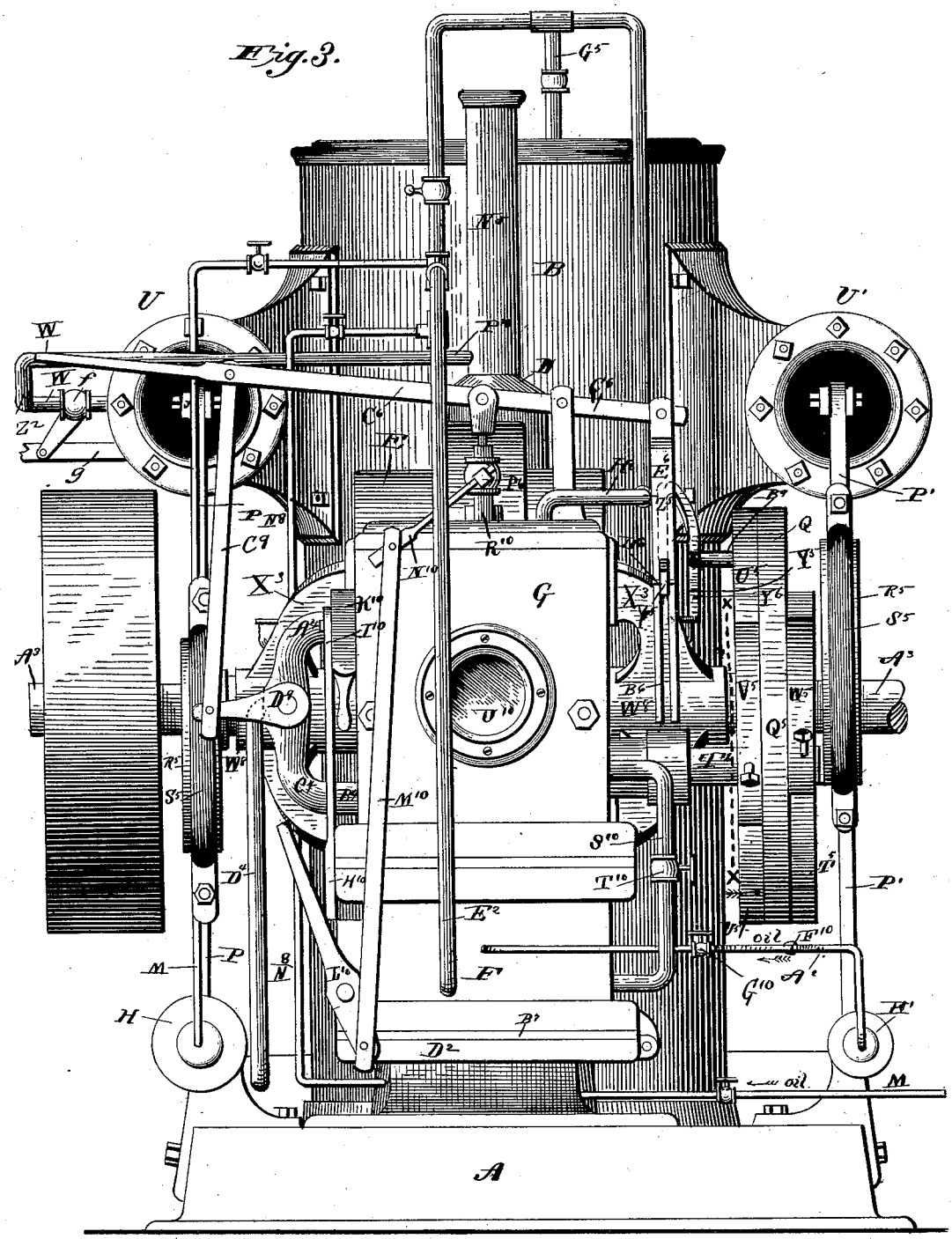

(No Model.) 10 Sheets—Sheet 4.
B. F. WRIGHT.
COMPRESSED AIR ENGINE.
No. 408,784. Patented Aug. 13, 1889.
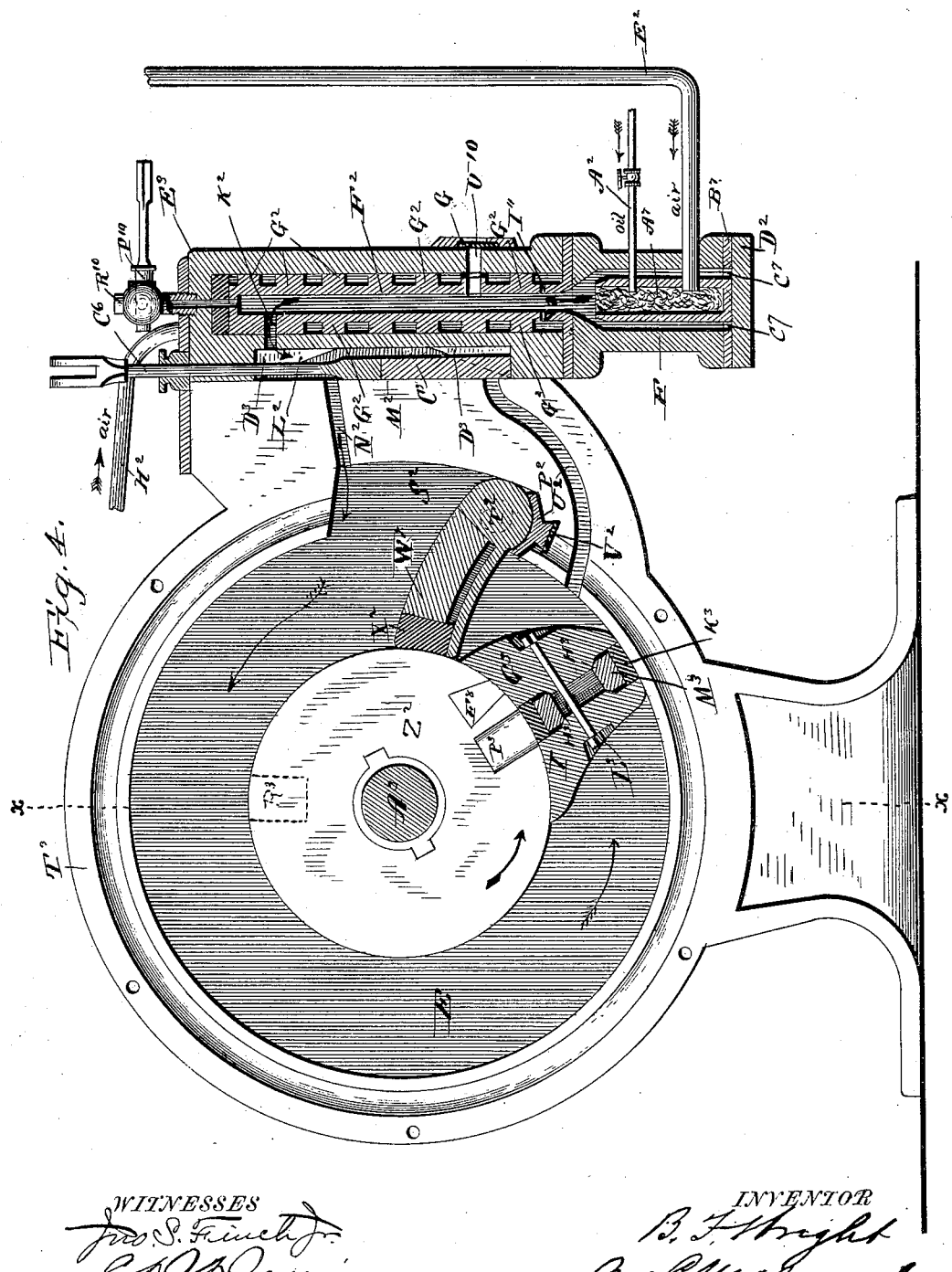

(No Model.) 10 Sheets—Sheet 5.
B. F. WRIGHT.
COMPRESSED AIR ENGINE.
No. 408,784. Patented Aug. 13, 1889.
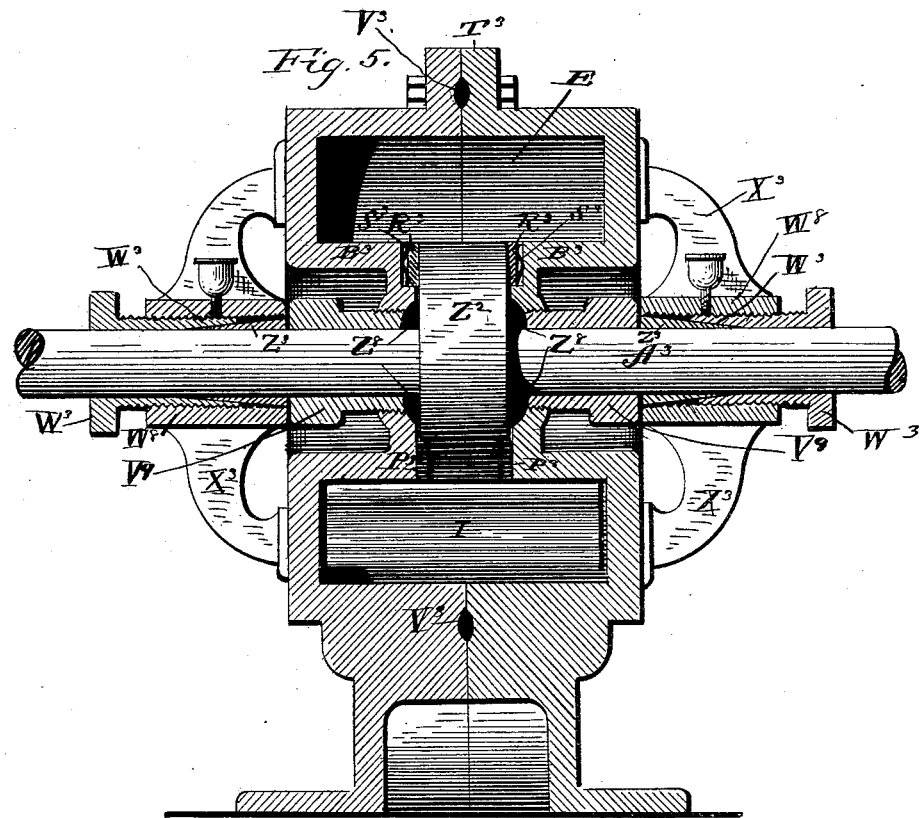
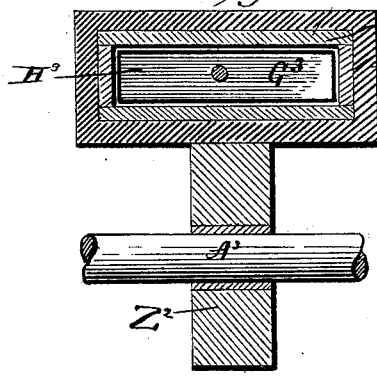
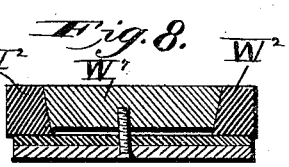
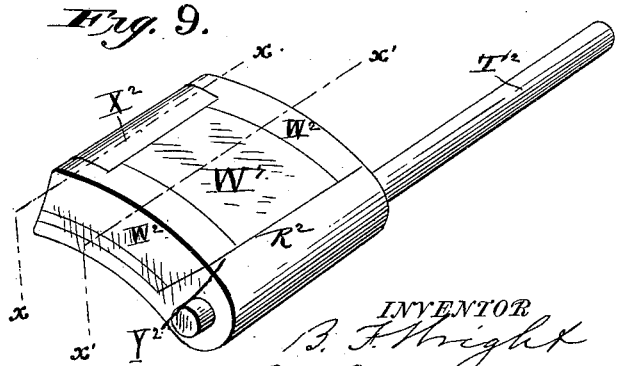
WITNESSES
INVENTOR
B. F. Wright
By C. M. Alexander
Attorney (No Model.) 10 Sheets—Sheet 6.
B. F. WRIGHT.
COMPRESSED AIR ENGINE.
No. 408,784. Patented Aug. 13, 1889.
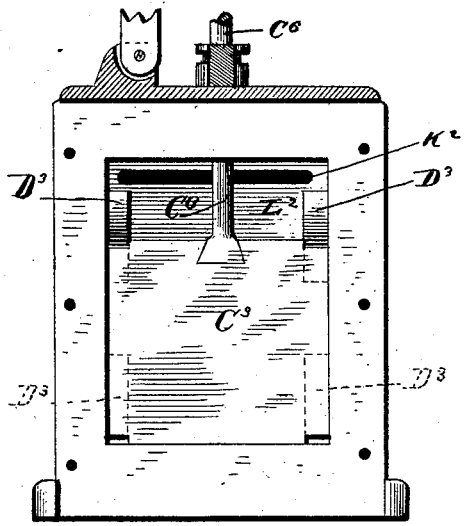
Fig. 10.
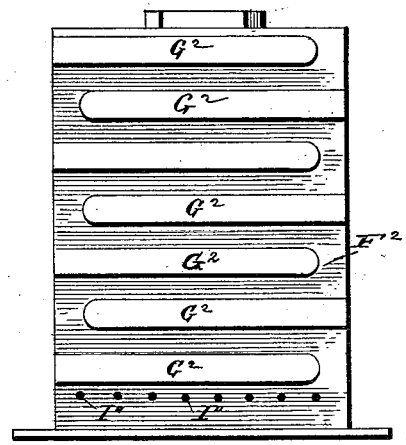
Fig. 11.
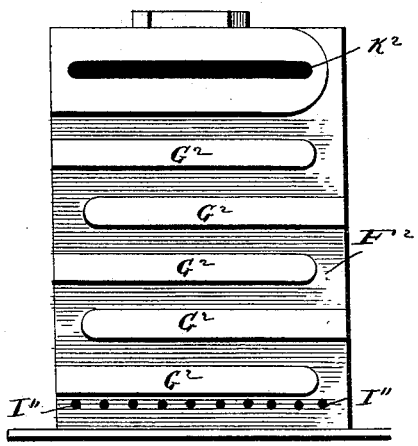
Fig. 12.
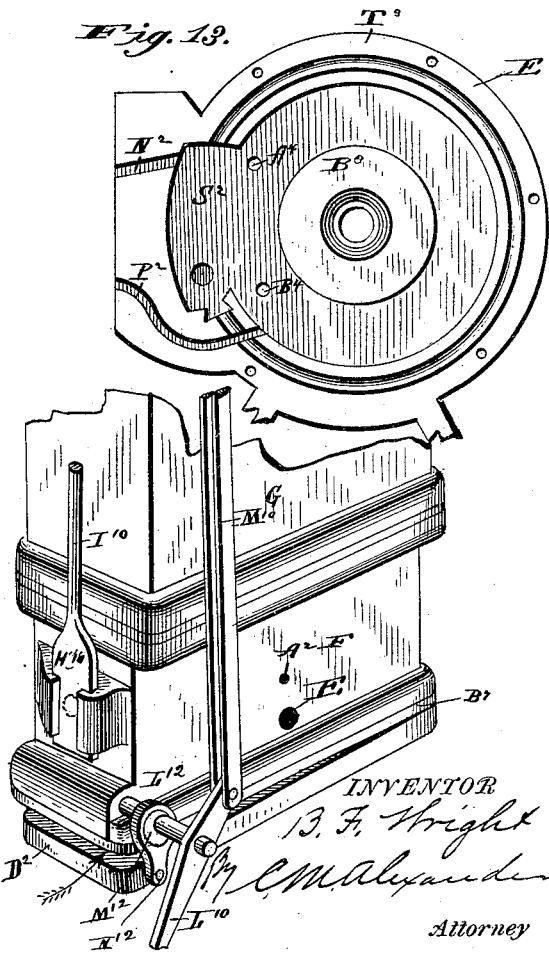
Fig. 13.
Fig. 14.
WITNESSES
INVENTOR
B. F. Wright
Attorney (No Model.) 10 Sheets—Sheet 7.
B. F. WRIGHT.
COMPRESSED AIR ENGINE.
No. 408,784. Patented Aug. 13, 1889.
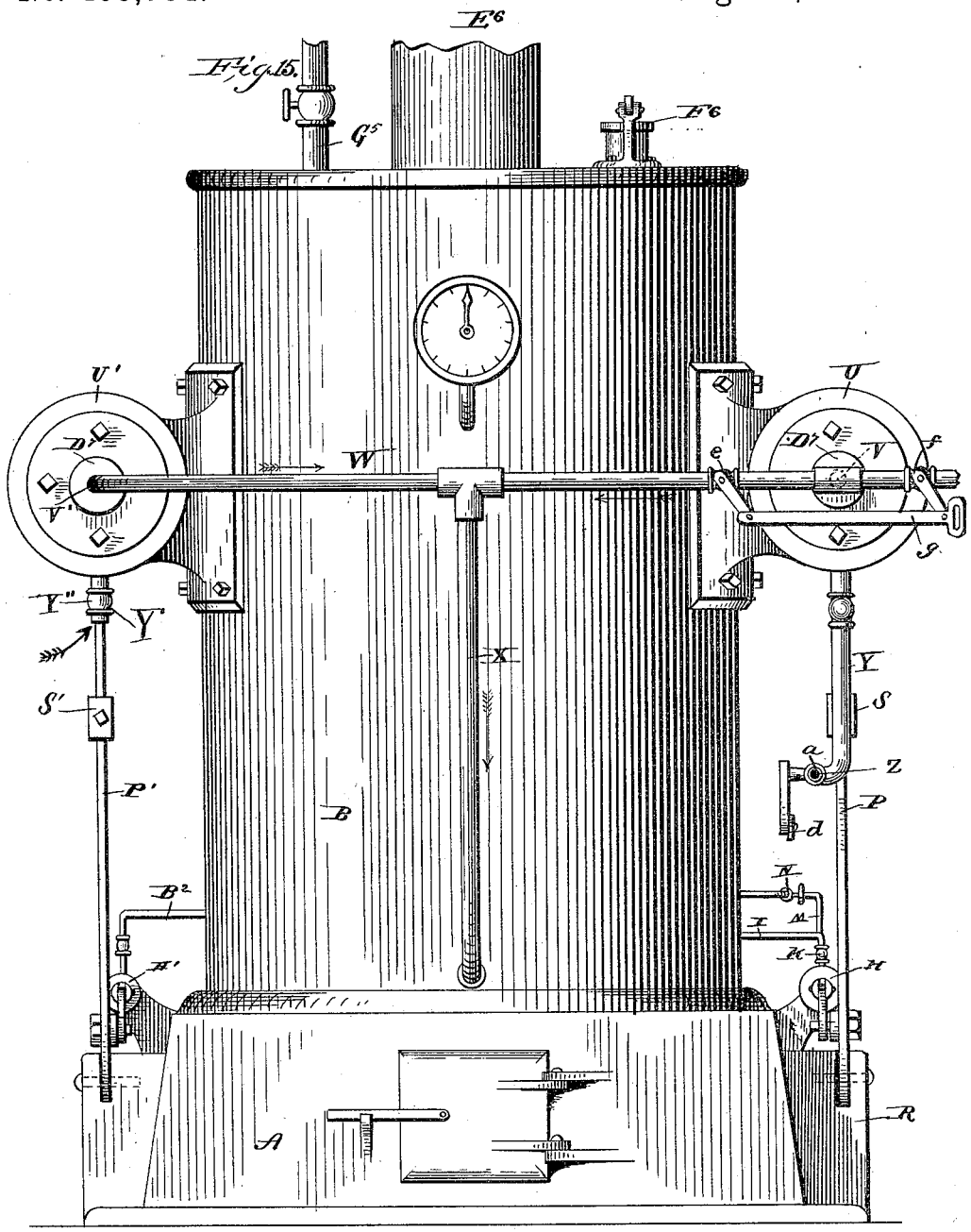
WITNESSES
INVENTOR

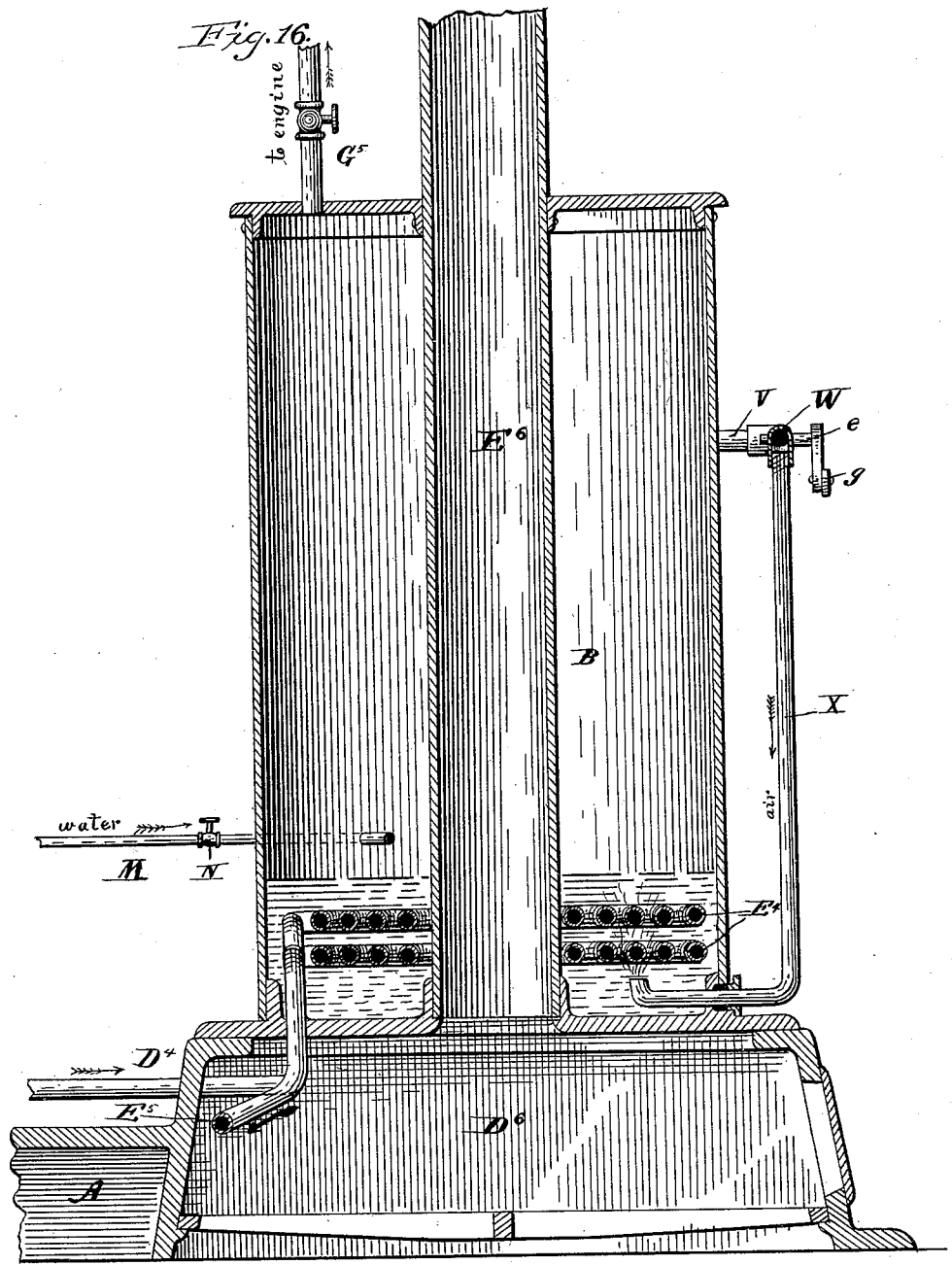

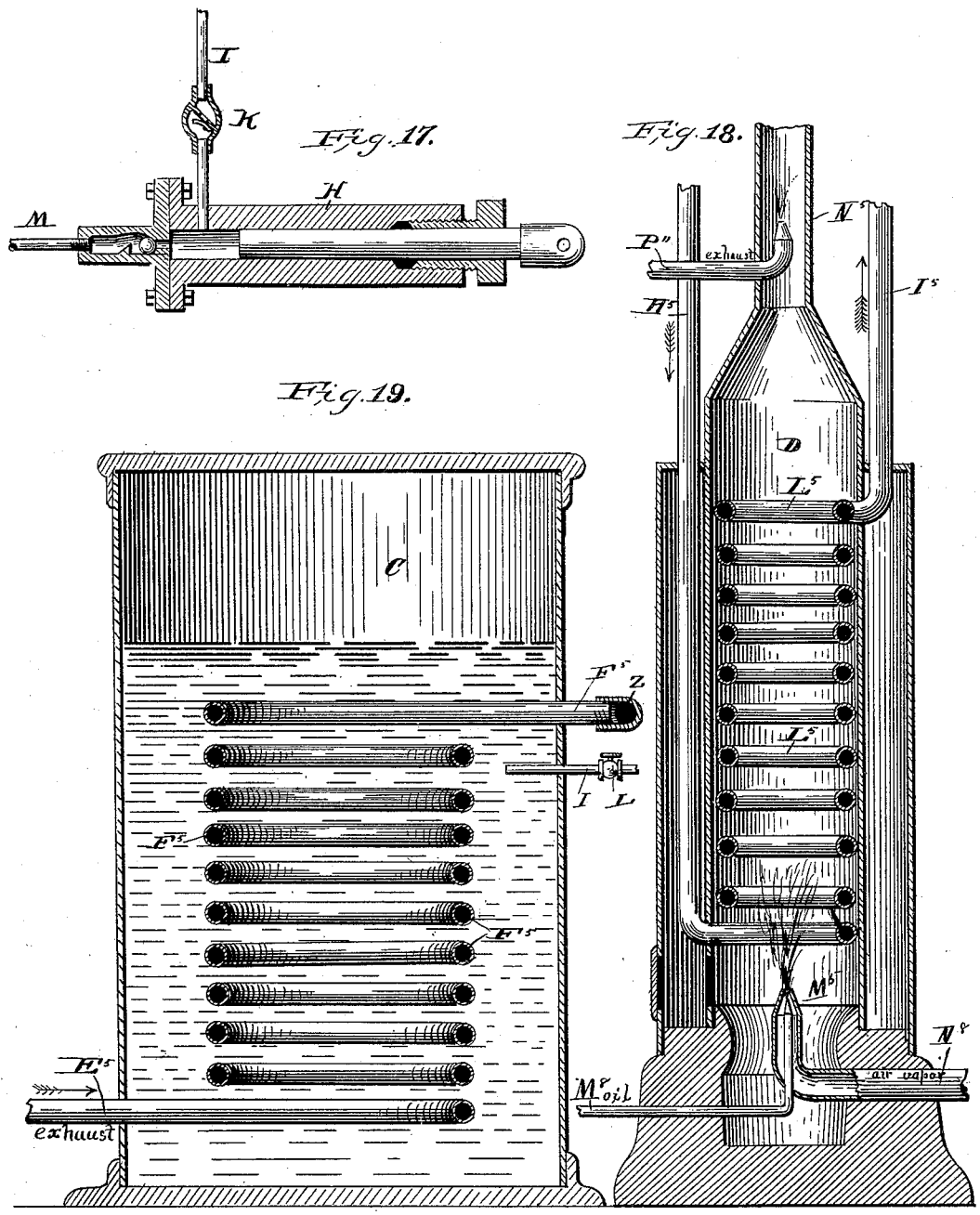

(No Model.) 10 Sheets—Sheet 10.

B. F. WRIGHT.
COMPRESSED AIR ENGINE.

No. 408,784. Patented Aug. 13, 1889.

WITNESSES
INVENTOR
B. F. Wright
By C. M. Alexander
Attorney

UNITED STATES PATENT OFFICE.

BENJAMIN F. WRIGHT, OF LOVINGSTON, VIRGINIA.

COMPRESSED-AIR ENGINE.

SPECIFICATION forming part of Letters Patent No. 408,784, dated August 13, 1889.

Application filed September 26, 1888. Serial No. 286,442. (No model.)

*To all whom it may concern:*

Be it known that I, BENJAMIN F. WRIGHT, a citizen of the United States, residing at Lovingston, in the county of Nelson and State of Virginia, have invented certain new and useful Improvements in Compressed-Air Motors, of which the following is a specification, reference being had therein to the accompanying drawings.

This invention relates to an improved motor or engine to be operated by the expansive force of the products of combustion of an inflammable fluid, and it has for its objects to provide for the combustion of such fluid, in connection with compressed air and aqueous vapor, in such manner as to quickly and thoroughly consume the fluid and to utilize the expanding gases developed to give motion to the motor or engine; and the invention consists, essentially, in the construction, arrangement, and combination of the parts of the air, vapor, and fluid-supplying devices and the motor or engine, as more fully hereinafter set forth in the claims.

Figure 20:
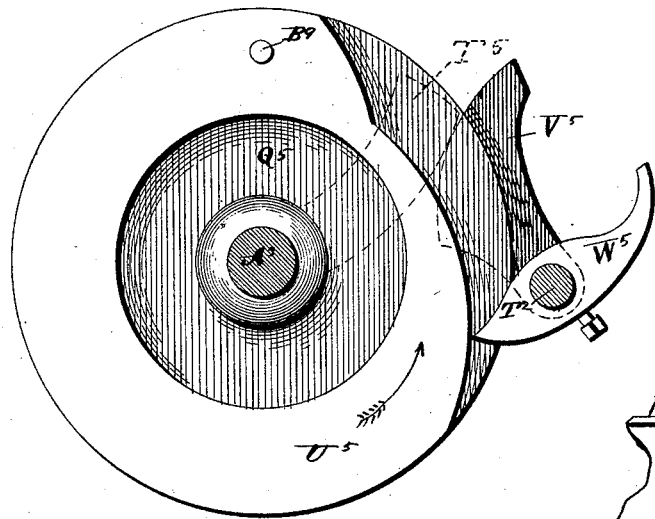
Figure 21:
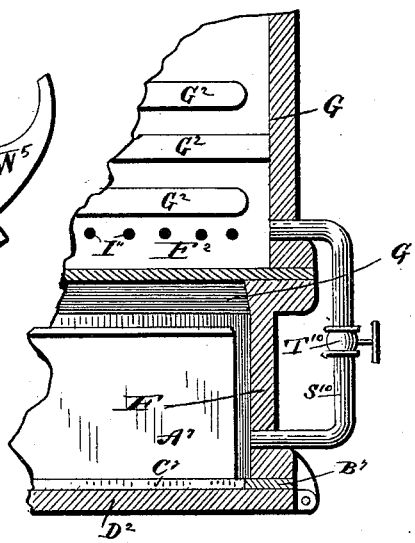
Figure 22:
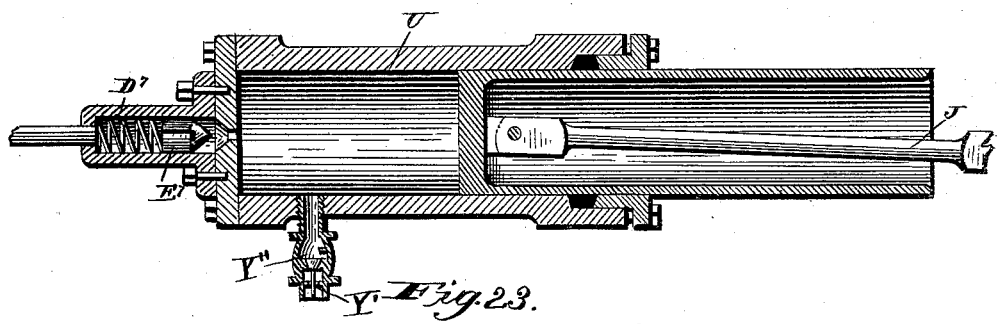
Figure 23:
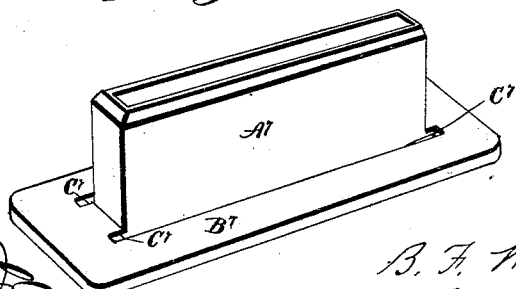

In the accompanying drawings, Figure 1 represents a view of one side of the apparatus embracing my invention; Fig. 2, a view of the opposite side thereof. Fig. 3 is an end view of the apparatus looking toward the burner. Fig. 4 represents a vertical sectional view of the motor and the burner in which the combustion of the inflammable vapor is effected. Fig. 5 represents a vertical sectional view of the motor, taken on the line $x\,x$ of Fig. 4. Fig. 6 represents a detached sectional view of the piston of the motor, showing the method of packing the same. Fig. 7 represents a transverse sectional view of the valve, taken on the line $x\,x$ of Fig. 9. Fig. 8 represents a similar view taken on the line $x'\,x'$ of Fig. 9. Fig. 9 represents a perspective view of the valve detached. Fig. 10 represents an end view of the valve-box of the motor with the cover removed, showing the interior of such box and the reversing-valve located therein. Fig. 11 represents a view of one side of the inner shell of a superheater connected with the burner. Fig. 12 represents a similar view of the opposite side of said shell. Fig. 13 represents an inside view of one section of the shell of the motor or engine. Fig. 14 represents a perspective view of the burner, showing the opening for lighting the fluid and the means for supplying air to support combustion initially and for maintaining it when the motor is not in operation. Fig. 15 is an end elevation of the air and vapor holder and the pumps for compressing the air therein. Fig. 16 is a vertical central sectional view of the said holder, showing the means for heating the same to vaporize the water therein. Fig. 17 represents a detached sectional view of the pump for supplying water to the holder. Fig. 18 represents a vertical sectional view of a superheater, wherein the vapor and air are heated on their course to the burner. Fig. 19 is a sectional view of a feed-water heater for heating the water supplied to the air and vapor tank; Fig. 20, a sectional view taken on the line $x\,x$ of Fig. 3, looking in the direction of the arrow; Fig. 21, a detail sectional view of a portion of the burner, which will be more fully hereinafter described; Fig. 22, a detail sectional view of one of the air-pumps attached to the compressed-air tanks; Fig. 23, a detail view of the burner proper.

Referring to the drawings, A indicates the base or bed upon which the various parts of my apparatus are erected.

B indicates a tight vessel wherein aqueous vapor is generated and into which compressed air is forced and stored.

C indicates a feed-water heater; D, a superheater, in which the air and vapor are heated on the way to the burner.

E indicates the engine or motor, F the burner, and G a combustion-chamber and superheater connected therewith.

H indicates a pump connected with the feed-water heater C by means of a pipe I, having a check-valve K and controlling-valve L. The said pump also connects with the lower part of the holder B by means of a pipe M, which is provided with a controlling-valve N, by means of which the said holder is supplied with water from the feed-water heater. The piston-rod of said pump is connected to an oscillating segment-lever P, fulcrumed at its lower end to a pillow-block R, which lever receives its motion from the rod S, connected with an eccentric on the shaft of the motor or engine, as more fully hereinafter explained. To the upper end of said segment is connected the piston-rod J of an air-pump U, which is bolted to the outside of the holder B. The said pump connects by means of a pipe V with a cross-pipe W, Figs. 15 and 16, from which extends a branch pipe X into the lower part of the holder, where it terminates in an upward extension below the surface of the water, as indicated in Figs. 15 and 16 of the drawings. The pump also has an induction-pipe Y, Fig. 1, leading from the air-pipe Z, by means of which air to be compressed into the holder is supplied. The pipe Z also connects with the exhaust-pipe $F^5$ of the feed-water heater C and with the exhaust-pipe P'', leading into the stack of the superheater. The said pipe Z is provided with valves $a\ b\ c$, which are simultaneously operated by the connecting-rod $d$, as more fully hereinafter described.

The pipe W at each side of the cylinder U is provided with valves $e\ f$, which are simultaneously operated by means of a connecting-rod $g$, and with the pipe $Z^2$, leading to the exhaust-pipe P'', so that the exhaust may be taken from the coil $F^5$ and forced into the stack of the superheater, as more fully hereinafter explained.

A pump U', similar to pump U, is located on the opposite side of the holder B and connects by means of a pipe V' with the pipe W, before mentioned, the said pump being provided with an induction-pipe Y', provided with a check-valve Y''. The piston-rod of said pump is connected with a segment P', similar to the segment P, which is driven by a rod S', connected with an eccentric on the shaft of the motor, as more fully hereinafter explained. The pumps U and U' are provided with valve-chambers $D^7$, having spring-actuated valves $E^7$, which become balanced when opened. The said segment P' has also adjustably connected with it by means of a pitman the piston-rod of pump H', which supplies oil to the burner F through a pipe $A^2$, the oil being supplied from a suitable source by a pipe $B^2$, the flow being regulated by a governor $C^2$, deriving its motion from the engine or motor through the medium of a band or suitable gearing. The said burner is shown in detail in Fig. 23 of the drawings, and consists of a shell F, of metal or other suitable material, preferably of rectangular shape, as shown in the present instance, open at the top and bottom, the bottom being provided with a hinged plate $D^2$, by means of which a variable amount of air may be admitted to support combustion initially, or when the engine or motor is not in operation. The upper opening or throat of the shell is contracted, as shown, so as to concentrate the flame of the burning fluid at that point. Within the outer shell of the burner is located a shell $A^7$, of suitable material, which is filled with an absorbent packing of asbestus or other refractory material, which serves as a wicking to supply the inflammable fluid to the initial point of combustion. The said shell has a flanged base $B^7$, which is provided with openings $C^7$ for the admission of air from below. The oil-pipe $A^2$ enters and discharges into this inner shell near the top thereof, and below it enters an air or vapor pipe $E^2$, to be more fully hereinafter described. The upper end of the outer shell of the burner is provided with a seat, to which the lower flanged portion of the internal shell $F^2$, constituting a combustion-chamber, is attached, the said shell being inclosed in an outer shell which constitutes the superheater G, before mentioned. The shell $F^2$ on its outside is provided with ribs $G^2$ on opposite faces, which with the inner walls of the outer shell G form tortuous passages for air supplied through a pipe $H^2$. Near the lower end of the shell $F^2$ a series of perforations I'' are formed, which supply the combustion-chamber of the inner shell $F^2$ with air to support combustion therein. The said shell $F^2$ near its top on one side is provided with a passage $K^2$, leading into the valve-chamber $L^2$, through which the expanded products of combustion pass to the motor or engine.

The portion of the shell G which contains the valve-chamber sets closely against and is secured to a seat $M^2$ at one side of the engine or motor casing or cylinder. Through said seat pass the induction-ports $N^2\ P^2$ to the interior of the cylinder or casing to either side of a valve $R^2$, which is fulcrumed in the lower part of a recess $S^2$ at one side of the casing, the valve being provided with a stem $T^2$ at one side, by which it may be operated. Against the lower part of the valve bears a packing-block $U^2$, of copper or other suitable metal, which has a curved bearing-face and is pressed yieldingly against the valve by means of a spring-packing $V^2$. The valve is constructed, as shown in detail in Figs. 7, 8, and 9 of the drawings, with packing-sections $W^2$ and $X^2$, of copper or other suitable material, which set upon the convex face of the curved wing of the valve and bear against a seat or shoulder $Y^2$. The packing $X^2$ bears against the periphery of a rotating disk $Z^2$ on the driving-shaft $A^3$ and the peripheries of the stationary disks $B^3$ on the inside of the sections of the engine shell or cylinder, and the packings $W^2$ are beveled on their internal edges and pressed outward by the beveled edges of an intervening block $W^7$, so as to pack the piston and prevent the gases from passing beyond it. Within the valve-chamber $L^2$ is located a reversing-valve $C^3$, Fig. 4, provided with a valve-stem $C^6$, by means of which it may operated to open or close the ports $N^2$ and $P^2$ alternately to run the engine in opposite directions, as more fully hereinafter explained, the valve being pressed to either port by means of the inclined ribs $D^3$, as shown in Fig. 4 of the drawings. The rotating disk $Z^2$ is located between the stationary disks $B^3$, and at a suitable point on its periphery is provided with a dovetail recess, in which is fitted the dovetail shank $F^8$ of a piston-section $G^3$, which is secured to the periphery of the rotary disk thereby. The said section is curved on one face and its opposite face is provided with a central beveled abutment $H^3$. $I^3$ indicates a similar section which has a similar abutment $H^3$, the two sections being adjustably secured together by a threaded bolt $L^3$ and a nut, the nut and bolt-head setting in suitable recesses in the outer faces of the sections. Between the sections and resting upon the beveled edges of the abutments thereof, are arranged packing-plates $M^3$, which have beveled edges bearing against the beveled edges of the abutments $H^3$, so as to be pressed outwardly thereby as the sections are brought together, so as to distend a packing $K^3$ surrounding the plates, and thus pack the piston effectually.

The rotating disk is provided with recesses on opposite sides, which are fitted with packing-plates $P^3$, which are rounded or beveled on the outside, as shown in Fig. 4 of the drawings. The stationary disks $B^3$ are also provided with similar packing-plates $R^3$, the respective packing-plates being pressed normally outward of their recesses by means of springs $S^3$, as shown in Fig. 5 of the drawings.

The motor casing or shell is constructed in two parts with flanges $T^3$, which are bolted together. The adjoining faces of the flanges are formed with annular packing-recesses, in which an annular packing $U^3$ is confined to prevent the escape of the gases of combustion which drive the motor. The shaft $A^3$ has its bearings in glands $V^9$, which are screw-threaded externally at one end and are secured in threaded openings in the stationary disks $B^3$. These glands serve to press the packing $Z^8$ to the faces of the rotary disks. The said shaft also passes through externally-threaded glands $W^3$, which are screwed in internally-threaded tubular supports $W^8$ of the brackets $X^3$, secured to the opposite sides of the motor casing or shell. The inner ends of these last-mentioned glands are reamed out, forming beveled bearings for the conical thimbles $Z^3$, which surround the shaft, whereby the wear may be taken up from time to time, as occasion may require, so that the engine may always run with accuracy.

The letters $A^4$ and $B^4$, Fig. 1, indicate the exhaust-ports of the engine, one leading from each side of the valve $R^2$ and connecting, by means of a pipe $C^4$, Fig. 1, with a pipe $D^4$, leading into the lower portion of the holder B and passing through the same in a coil $E^4$, Fig. 16, and out through a pipe $E^5$ into the coil $F^5$, Fig. 19, in the feed-water heater C, by means of which the water in the holder B is vaporized and the feed-water in the feed-water heater heated previously to being supplied to such holder. From the upper part of the holder extends a pipe $G^5$ to the pipe $E^2$, which connects with the burner F. The said pipe $G^5$ connects by branch pipes $H^5$ $I^5$, having suitable controlling-valves $K^5$ $K^6$, with the coil $L^5$ of the superheater D, before mentioned. The said superheater D is composed, in the present instance, of an internal and external shell, with a space between the two, the coil being located in the inner shell, which constitutes a combustion-chamber, and is heated by an injector-burner $M^5$, receiving inflammable fluid and the air and vapor through suitable pipes $M^8$ $N^8$, and provided with a chimney $N^5$, into which the exhaust of the engine is finally discharged from the exhaust-pipe $P''$. The branch pipe $H^5$ connects by the pipe $E^2$, before mentioned, with the internal shell $A^7$ of the burner, so as to supply the same with superheated air and vapor to urge the combustion of the inflammable fluid.

The shaft $A^3$ of the motor or engine extends to each side of the shell or casing thereof, and is provided with eccentrics $R^5$, which are embraced by the eccentric-straps $S^5$ on the arms S and $S'$, which actuate the segment-levers P and $P'$, before mentioned. At one side the said shaft $A^3$ is provided with a rotating disk $Q^5$, having cam-plates $T^5$ $U^5$ on opposite sides, the former one of which actuates cam-arm $V^5$, secured to the valve-stem $T^2$ of the valve $R^2$ to actuate the same when the engine is reversed, as more fully hereinafter explained.

The letter $Y^5$ indicates an angle-lever fulcrumed to the stem of the valve $Z^5$ of the pipe $G^5$ and having a pin $D^6$ near one end, the said end working in a slotted arm $B^6$, secured to a lever $C^6$, which is provided with a rod $C^9$ for controlling the exhaust-valve $D^9$ for reversing. The said angle-lever is also operated by a friction-roller $B^9$ to open the valve $Z^5$ at the proper time to supply air and vapor to the burner and is closed by a spring, after which the engine for the remaining travel of the piston is worked expansively.

Below the holder B is located a furnace $D^6$, having a smoke-stack $E^6$ extending through the holder, by means of which the holder may be heated by ordinary fuel, being especially designed to utilize the waste products of saw-mills and the like, or to be heated by means of gas, oil, or other fuel, to add to the capacity of the engine when required.

The pipe $B^2$, leading from the oil-supply to the oil-pump, is provided with a valve $B^{10}$, operated by the lever $C^{10}$, connected with the vertically-operated rod $C^{11}$ $D^{10}$ of the governor to supply the oil in automatically-regulated quantities to the pump, and also with a controlling-valve $E^{10}$, by means of which the quantity of oil delivered from the oil-supply to the pump is regulated. The pipe $A^2$, leading from the pump to the burner, is also provided with a check-valve $F^{10}$ and a controlling-valve $G^{10}$, by means of which the oil supplied from the pump to the burner is regulated.

In Figs. 1, 2, 3, and 14, $H^{10}$ indicates a gate-valve arranged to slide in ways in front of an aperture at one side of the burner, whereby said aperture may be opened for the purpose of lighting the oil, the said gate being provided with a stem $I^{10}$, connecting with a lever $K^{10}$, by which it is operated.

$L^{10}$ indicates a lever which is mounted on one end of the shaft upon which eccentrics $M^{12}$ are mounted, the said eccentrics having straps $N^{12}$, which are pivotally connected to the plate $D^2$ to move the same, so as to regulate the draft of the lower part of the burner. The said lever $L^{10}$ is also connected with the lever $N^{10}$ by means of rods $M^{10}$, the lever $N^{10}$ being secured to the valve-stem $P^{10}$ of a valve in the exhaust-pipe $R^{10}$, extending from the combustion-chamber $F^2$, so as to supply air and permit of an exhaust directly to and through the said combustion-chamber initially and when the engine is not running.

In order to supply the chamber around the inner shell $A^7$ of the burner F with compressed air and vapor, which is desirable in some instances, a connecting-pipe $S^{10}$ (shown plainly in Fig. 21 of the drawings) is provided, which connects said space with the lower part of the superheater G, the pipe being provided with a valve $T^{10}$, by means of which the air and vapor may be turned on and off or its flow regulated as required. The water-pipe M has connected with it a pipe $m$, having a valve $n$, by means of which superheated air and vapor may be supplied with the feed-water to the holder B.

In order to observe the character of the flame in the burner, so as to regulate the amount of oil and air supplied, a peep-hole $U^{10}$, having a transparent cover, is provided at one side of the said burner.

The operation of my invention is as follows: The holder B being properly charged with water in any convenient manner, air is supplied to the said holder and compressed therein. Heat is then applied, which may be initially done by the furnace $D^6$. A proper quantity of oil is then supplied to the burner F and ignited, the plate $D^2$ being partly opened, so as to initially supply air to support combustion. The air and vapor are then admitted to the burner through the pipes $G^5$ and $E^2$ and forced up through the refractory absorbent in the shell $A^7$, which suddenly increases the combustion and volume of flame, which is concentrated at the contracted throat of the shell F, the volume of gases and the products of combustion passing upward into the combustion-chamber $F^2$. Here the gases are met by a fresh volume of air and vapor passing in from the tortuous passages of the superheater G through the opening $I^2$, where the thorough consumption of the unconsumed products of combustion is effected, the carbonaceous portions of the said products in part decomposing the aqueous vapor, setting the hydrogen free, which, by uniting the oxygen of the air with said burning products of combustion, produces an intense heat and a large volume of expanded and still expanding gases, which pass through the port $N^2$, as indicated by the arrow, into the piston-chamber of the engine or motor E, forcing the piston thereof in the direction shown. When the piston reaches the position indicated in Fig. 4 of the drawings, it will force the valve $R^2$ upward, the exhaust in the meanwhile passing off through the port $B^4$, and the piston will pass said valve, which will then return to its normal position, so that the piston will continue to be forced forward, giving a rotary motion to the eccentrics on the driving-shaft and a reciprocating motion to the rods S S', which oscillate the segments P and P'. These in turn give a reciprocating motion to the pistons of the pumps U and U', causing air to be taken in through the pipes Y and the valves thereof, as well as the valve $a$ of the pipe Z, which is open for the purpose, the valve $c$ of the pipe Z being closed and the valve $e$ of the pipe W being open. The air will be forced out of the pump-cylinders through the pipes W and X into the holder C and compressed therein, and from thence supplied to the burner, as before mentioned. The exhaust from the engine or motor in the meanwhile will pass through the pipe $D^4$ into and through the coil $E^4$, raising the temperature of the water in the holder, so as to convert it into aqueous vapor, which continues with the compressed air and is carried thereby to the burner. The exhaust then escapes through the pipe $E^5$ into the coil $F^5$ of the feed-water heater, and from thence through the pipe Z into the final exhaust-pipe P'', the valve $e$ being open and the valve $b$ of said pipe being closed. The segments P and P' will also operate the pumps H and H'. The pump H will take water from the feed-water heater C through the pipe I, and will force it into the holder B through the pipe M. The pump H' will take oil through pipe $B^2$ and will force the oil to the inner shell of the burner to be ignited. When it is necessary to employ the superheater D, the valves $H^7$ and $K^6$ are closed and the valves $K^5$ and $I^7$ are opened, causing the air and aqueous vapor from the holder B to pass through the coil $L^5$ and through the pipe $E^2$ to the burner. At a proper point in the travel of the piston the bent lever $Y^5$ will be operated by the friction-roller $E^9$ on the rotating disk $Q^5$ to open the valve $Z^5$ and supply air and vapor to the burner, the said lever, after being released by the friction-roller, being operated by its weighted end $Y^6$ to cut off the supply of air and vapor and permit the supply of gases to work expansively.

The cams $V^5$ and $W^5$ on the shaft of the valve $R^2$ remain idle while the engine is running forward; but when reversed the valve $R^2$ is raised by means of cam $T^5$ and cam-arm $V^5$, and after the piston has passed the valve the cam-arm $V^5$ rests against the periphery of cam $U^5$ and serves to lock the valve $R^2$ in the position shown in Fig. 4.

The pump U, when desired, may be used to exhaust the gases from the engine by closing the valves $c$, $a$, and $e$ of the pipes Z and W and opening the valves $b$ and $f$ thereof, when the products will be drawn from coil $F^5$ through pipes Z and Y by the pump and forced through the pipes W and Z to the final exhaust $P''$.

Having thus fully described my invention, what I claim as new, and desire to secure by Letters Patent, is—

1. In a motor, the combination of a burner composed of an inner and outer shell with intermediate air-passages, a filling in the inner shell, pipes for feeding the vapor and fluid to the burner, a hinged plate for regulating the supply of air to the burner, links $N^{12}$, pivoted to this plate, eccentrics $M^{12}$, embraced by these links, and a shaft carrying these eccentrics, substantially as described.

2. In a motor, the combination of the combustion-chamber G, a burner F, attached thereto at its lower end, a hinged plate for regulating the supply of air to the burner, links $N^{12}$, connected to this hinged plate, eccentrics $M^{12}$, embraced by these links, a shaft carrying these eccentrics, a lever $L^{10}$ for operating this shaft, a pipe $R^{10}$, leading into the combustion-chamber, a valve in this pipe, and links or rods $M^{10}$, connecting the stem of this valve with the lever $L^{10}$, substantially as described.

3. In a motor, the combination, with the burner having air-passages at each side for the admission of air to support combustion, of the hinged plate whereby the passages are opened and closed to regulate the supply of air, substantially as specified.

4. In a motor, the combination, with the driving-shaft of the engine or motor, of the eccentrics mounted thereon, the eccentric-arms, the oscillating segments to which said arms are adjustably connected, the air-pumps having their piston-rods connected with said segments, and the compressed-air holder connected with said pumps and with the burner of the motor, substantially as and for the purposes set forth.

5. In a motor, the combination, with the segments P, of a pump having its piston-rod adjustably connected therewith, and the pipe-connections communicating with the feed-water heater and the pump and compressed-air holder, whereby water is supplied to said holder, substantially as and for the purposes specified.

6. In a motor, the combination, with the segments P P', the driving-arms S S', adjustably connected to the said segments and the eccentrics of the motor, of the air-pumps, the water-pump, and the oil-pump, having their piston-rods connected with said segments, whereby the respective pumps are simultaneously operated, substantially as and for the purposes set forth.

7. In a motor, the combination, with the exhaust-pipe of the engine, of the coil connected therewith and the compressed-air holder, in the lower part of which the coil is located, substantially as and for the purposes set forth.

8. In a motor, the combination, with the coil located in the compressed-air holder, of the feed-water heater, the coil located therein, and the pipe connecting the respective coils, whereby the water in the feed-water heater is heated, substantially as specified.

9. In a motor, the combination, with the coil of the feed-water heater and the air-pumps U, of the pipe Z, having valves $a$ $b$ $c$, the pipe Y, connecting the said pipe with the pump, the pipe W, having valves $e$ $f$, and the pipe $Z^2$, leading to the stack of the superheater D and arranged to operate substantially as and for the purposes specified.

10. In a motor, the combination, with the holder B, of the pipe $G^5$, leading to the burner and provided with a valve $H^7$, the pipes $G^5$ $I^5$, having valves $H^5$ $K^5$, and the coil in the superheater connecting with said pipes $H^5$ $I^5$, whereby the air and aqueous vapor may be superheated in its course to the burner, substantially as specified.

11. In a motor, the combination, with the pipe $G^5$, of the valve $Z^5$, having an angle-lever $Y^5$ secured to its stem, of the disk $U^5$, secured to the driving-shaft of the engine, the friction-roller $B^9$, secured to this disk, whereby the said arm is actuated, and the lever $E^6$, connecting with the stem of the reversing-valve $C^3$ of the engine, whereby the products of combustion are automatically cut off from the cylinder and the oil supplied in properly-regulated quantities to the burner to permit the products of combustion to operate expansively, substantially as specified.

12. In a motor, the combination, with the external shell of the superheater $F^2$, of the internal shell and the ribs thereon forming tortuous passages for the compressed air and aqueous vapor, substantially as specified.

13. In a motor, the combination, with the burner, of the hinged plate $D^2$, the lever $L^{10}$, the shaft $L^{12}$, the eccentrics $M^{12}$ and straps $N^{12}$, the rod $M^{10}$, connecting with the said lever, the connecting-rod $N^{10}$, and valve $P^{10}$ of the exhaust-pipe, leading from the combustion-chamber $F^2$, whereby the draft through the combustion-chamber is regulated, substantially as specified.

14. In a motor, the combination, with the burner F and the superheater above the same, of the connecting-pipe $S^{10}$, having a controlling-valve $T^{10}$, whereby compressed air and vapor may be supplied to the burner, substantially as set forth.

15. The combination, in a motor, of a rotary engine, a combustion-chamber connected to the valve-box of the engine, this chamber being provided with superheating tortuous passages, these passages being connected to the combustion-chamber proper near its lower end by means of passages $I''$, a burner arranged immediately below this combustion-chamber, and valved pipes for conducting compressed air respectively to the said combustion-chamber and burner, substantially as described.

16. The combination, in a motor, of an engine, a burner and combustion-chamber connected thereto, an air-holder containing water, a coil or its equivalent for heating and vaporizing the water, means for compressing air into this holder, and valved pipes for conveying compressed air and vapor to the combustion-chamber, substantially as described.

17. In a motor, the combination of an engine, a combustion-chamber and burner connected to the engine, a compressed-air holder connected to the combustion-chamber by pipes, a valve $Z^5$ in these pipes, a weighted operating-lever $Y^5$, connected to this valve, and a disk or cam on the drive-shaft of the engine, provided with a pin $B^9$ for operating the said lever $Y^5$, substantially as and for the purpose specified.

18. In a motor, the combination, with a compressed-air holder, an engine provided with a burner, a pipe connecting this burner with the said compressed-air holder, means for compressing the air into the said holder, and a superheater connected to the said connecting-pipe between the air-holder and burner of the engine, and valves in the said pipe, substantially as described.

In testimony whereof I affix my signature in presence of two witnesses.

BENJAMIN F. WRIGHT.

Witnesses:
CHARLES D. DAVIS,
JNO. S. FINCH, Jr.